March 2, 1943.  H. W. STIEGLITZ  2,312,938
APPARATUS FOR SPOT WELDING
Filed Jan. 30, 1941  2 Sheets-Sheet 1
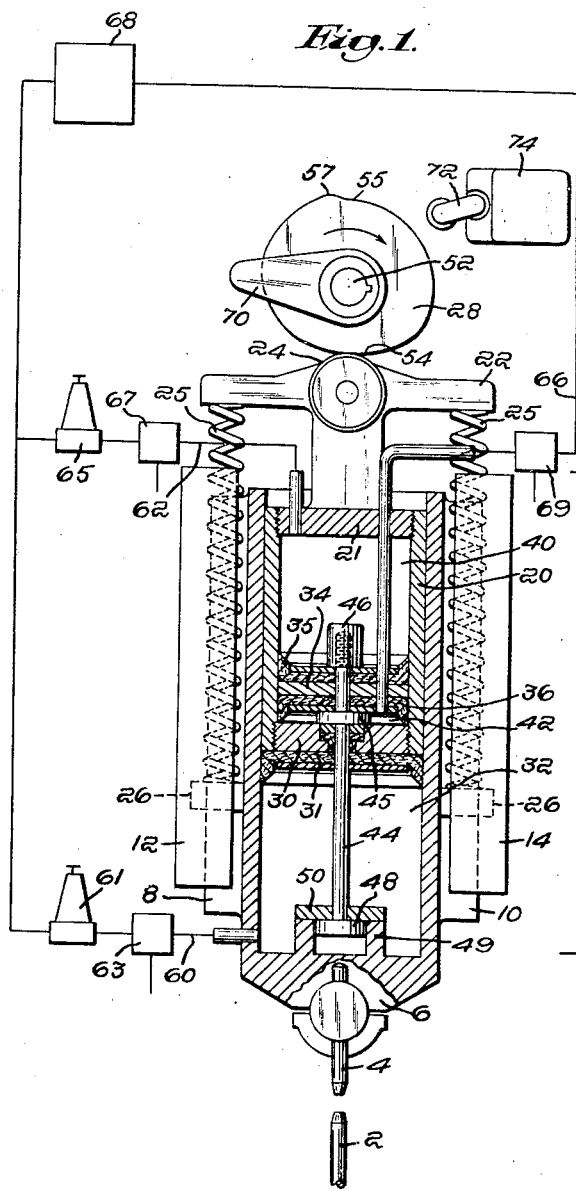
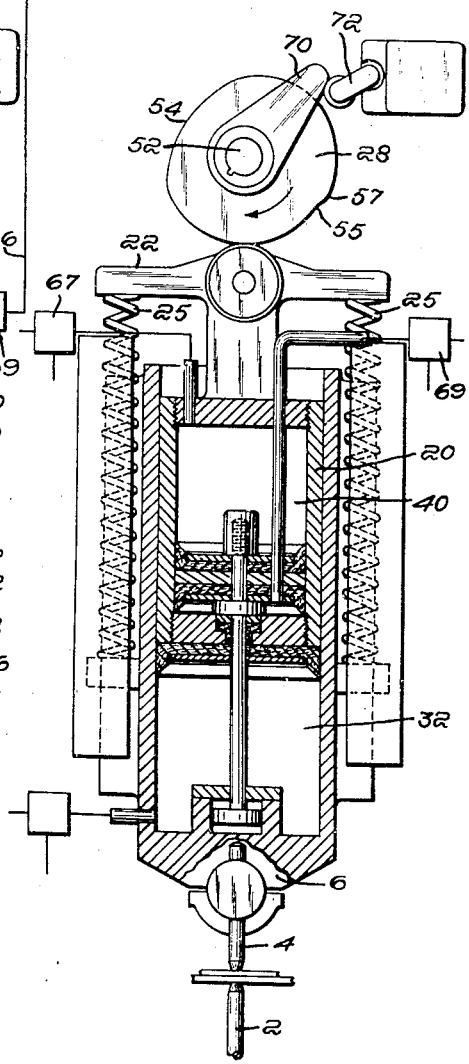
Inventor:
Hermann W. Stieglitz
Rowland V. Patrick
by Attorney

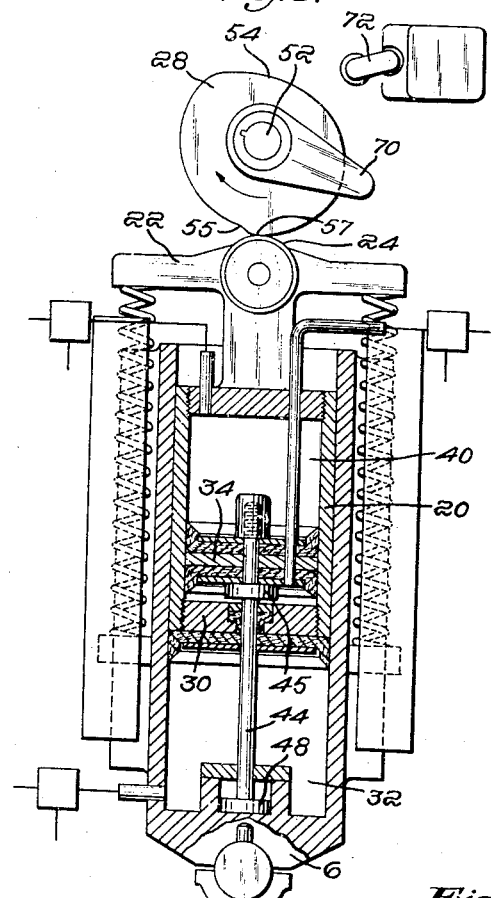
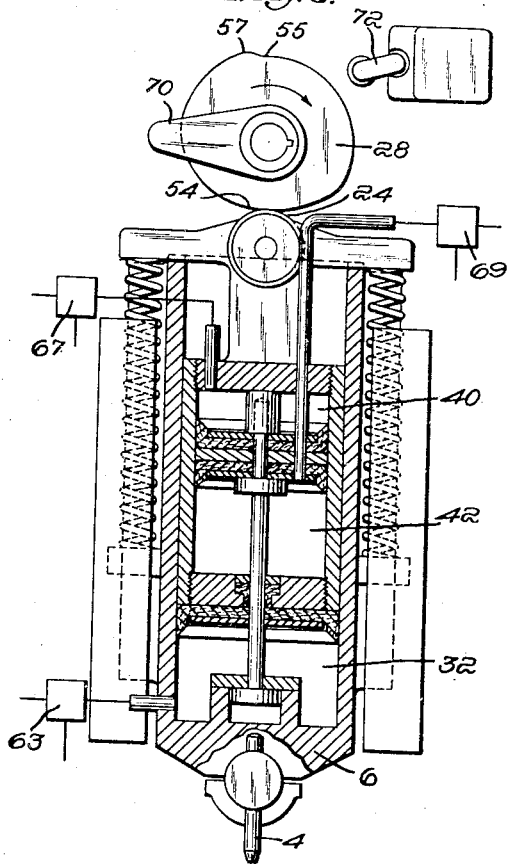
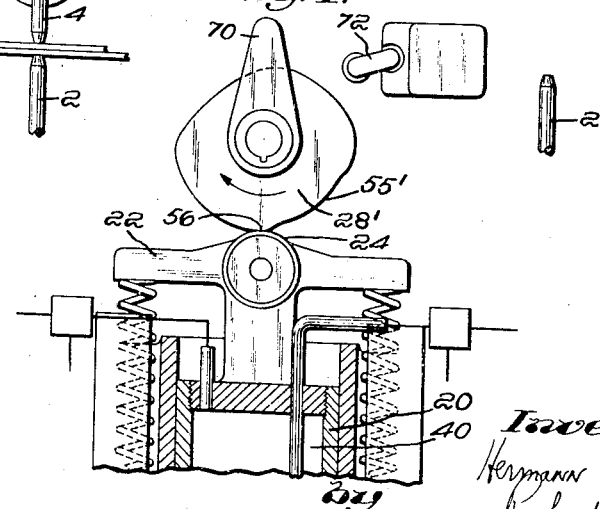

Patented Mar. 2, 1943

2,312,938

UNITED STATES PATENT OFFICE 2,312,938

APPARATUS FOR SPOT WELDING

Hermann W. Stieglitz, Marblehead, Mass., assignor to Thomson-Gibb Electric Welding Company, Lynn, Mass., a corporation of Massachusetts Application January 30, 1941, Serial No. 376,634

16 Claims. (Cl. 219—4)

This invention relates to electric resistance welding and more particularly to a pressure control apparatus for use in the operation of a movable electrode in spot welding and to a method of spot welding that I carry out with the aid of such apparatus.

The object of the invention is to produce strong spot welds that are free from cracks and such imperfections and in which the structure of the welded metal is of the character of a forging rather than that of cast metal. The invention is adapted to spot welding of thin sheets of metal, in particular such as aluminum and its alloys, in which heretofore spot welding has been impaired by the frequency of cracks and cast welds.

The apparatus of the invention provides means for applying to at least one welding electrode pressures of different intensities, preferably a high pressure before the welding current is started, a low pressure during the flow of the current and a final high pressure. The change from the low pressure to the high pressure is controlled by a cam so that the change is sudden and abrupt. The final high pressure is applied practically instantaneously when the metal reaches the maximum temperature and the current is cut off or so reduced in value as not to maintain the temperature of the metal and before the metal has had time to cool and thereby shrink. The high pressure is maintained while the metal cools and shrinks so that no cracks form in the metal, the structure of which has the character of a forging.

The abruptness of the change, practically instantaneous, from the low pressure to the high pressure and the consequences flowing therefrom are particularly important in the spot welding of sheets of aluminum alloys where, in spite of the high thermal conductivity of such metals, my apparatus and method have been uniformly successful in making crack-free forged spot welds.

The preferred mechanism of this invention is shown in the drawings, in which:

Fig. 1 illustrates partly in section a spot welding apparatus in normal non-operating position with the electrodes separated a convenient distance for permitting ready interposition of work to be welded.

Fig. 2 is a view similar to Fig. 1 illustrating certain parts shown in Fig. 1 in their positions when the low pressure is applied.

Fig. 3 shows the parts in their positions when the high pressure is applied.

Fig. 4 shows a modification of which certain parts are in their positions when a high pressure is applied before welding, the other parts being in their positions substantially as shown in Fig. 3.

Fig. 5 shows certain of the parts in fully retracted position.

Referring to Fig. 1, the lower electrode 2 is stationary and the upper electrode 4 is mounted for reciprocal vertical motion in alignment with the electrode 2. Electrode 4 is carried at the lower end of an outer cylinder 6 which is guided in its vertical movements by splines 8 and 10 projecting into ways 12 and 14 in the frame of the machine.

In the cylinder 6 is a hollow piston or inner cylinder 20 to the upper end wall 21 of which is fastened a cross bar 22 carrying a roller 24. Springs 25, supported on lugs 26 on the frame, press the roller 24 against the cam 28. The inner cylinder 20 has a lower end wall 30 with a leather 31 forming a piston which, with the sides and bottom end wall of cylinder 6 forms a main air chamber 32.

Within the inner cylinder 20 is a sliding member 34 having an upper leather 35 and a lower leather 36 and forming an inner piston within the inner cylinder 20. The upper end wall 21 of inner cylinder 20, the side walls of inner cylinder 20 and the inner piston 34 thus form an upper or auxiliary chamber 40. The inner piston 34, the sides of inner cylinder 20 and lower end wall 30 of inner cylinder 20 form an intermediate third chamber 42.

Secured to the inner piston 34 is a rod 44 provided with a disk collar 45 and a screw head 46 which clamps the collar 45 against the bottom of the inner piston 34. To the lower end of the rod 44 is fixed a disk collar 48 which is guided in a guide 49 to the upper end of which is secured a head 50.

The parts are operated by the cam 28 against which the roller 24 on the cross bar 22 is urged by the springs 25.

The cam 28 is keyed to a shaft 52, one revolution of which makes on spot weld. The cam 28 may be of any suitable shape for securing the desired movements of the pressure applying mechanism. The preferred cam shown has a low surface 54 shown in contact with the roller 24 in Fig. 1, a low lobe 55 shown in contact with the roller in Fig. 2 and a high lobe 57 shown in contact with the roller in Fig. 3.

Each of the air chambers 32, 40 and 42 is connected by an air line, 60, 62 and 66 respectively, with a source of compressed air at 68. Air line 60 contains a reduction valve 61 and a three-way valve 63. Air line 62 contains a reduction valve 65 and a three-way valve 67. Air line 66 contains a three-way valve 69.

The parts are shown in Fig. 1 with the upper electrode 4 in normal raised position for the insertion of the work. The chambers 32 and 40 contain compressed air of the desired intensity. The springs 25 press the cross bar 22 with its roller 24 against the lowest portion of the cam 28 thereby holding the inner cylinder 20 in the position shown. The disk collar 45 on top of the end wall 30 holds the rod 44 in the position shown and the disk collar 48 at its lower end holds the outer cylinder 6 in the position shown by its contact with the head 50 attached to that cylinder.

The operator starts the machine into operation which causes the shaft 52 and the cam 28 to rotate clockwise.

The rotation of the cam 28 brings the low lobe 55 against the roller 24, Fig. 2, to press the inner cylinder 20 down against the pressure of the springs 25. The downward movement of the inner cylinder 20, through the compressed air in the main chamber 32, forces the outer cylinder 6 downward to press the upper electrode 4 against the work.

The wolding current is started by the operation of the switch arm 72 by the arm 70 on the shaft 52 and is cut off by the usual instrumentalities before or very shortly after the application of the high pressure next to be described.

As the pressure between the electrodes on the work is of relatively low value, the welding current meets the usual resistance in spot welding at the joint between the work sheets or plates. This resistance causes the heating of the metal at that point so highly that it is liable to become molten.

The continued rotation of the cam 28 brings its high lobe 57 in contact with the roller 24 on the cross bar 22. This forces the inner cylinder 20 further down to its position shown in Fig. 3. This further downward movement of the inner cylinder 20 causes the air in the main chamber 32 to be further compressed and the air pressure in the auxiliary chamber 40 to be applied to the cylinder 6 as follows:—The downward movement of the end wall 30 of the inner cylinder 20 separates it from the disk collar 45 and permits the compressed air in auxiliary chamber 40 to press the end wall 34, which carries the rod 44, down until the disk collar 48 at the lower end of the rod presses against the cylinder 6 as shown in Fig. 3. The air pressure in the auxiliary chamber 40, acting on the end wall 34 and the rod 44, is thereby added to the air pressure in the main chamber 32 to press the upper electrode 4 against the work and the lower electrode 2. This pressure of maximum intensity on the metal in the joint of the work forges that metal so that when it cools a perfect weld results which is free from cracks and imperfections.

The continued rotation of the cam 28 carries the high lobe 57 away from the roller 24 and permits the springs 25 to lift the cross bar 22 and restore the parts to their normal inoperative position shown in Fig. 1. In the meantime the arm 70 has released the switch arm 72 which is returned by its springs, not shown, to the position shown in Fig. 1.

The welding operation is characterized by first a low pressure, Fig. 2, between the electrodes due to the action of the low lobe 55 and then to a high pressure, Fig. 3, due to the action of the high lobe 57. The former causes the upper electrode to be pressed against the work by the air pressure in main chamber 32 and the latter causes it to be pressed against the work by the pressure in both chambers 32 and 40.

It is frequently desirable, although not necessary, in spot welding to press the electrodes strongly against the work before the beginning of the operation. In such case a cam 28', shown in Fig. 4, is used which has a third or high lobe 56 in advance of the low lobe 55'. This high lobe contacts with the roller 24 before the beginning of the welding operation and thereby presses down the inner cylinder 20 to bring the parts to substantially the same position as shown in Fig. 3 in which the air pressures in the two chambers 32 and 40 are added together to press the upper electrode against the work and the lower electrode. Thereby good electric contact is made between the electrodes and the work preparatory to the spot welding operation.

In operation, the air lines 60 and 62 (Fig. 1) may carry a pressure of anywhere from 2 to 80 pounds per square inch, depending upon the type of operation desired and as controlled by the regulating valves 61 and 65. For example, the air pressure may be so controlled that the total pressure in the chambers exerted on the work can be varied anywhere from 100 to 1500 pounds in the low pressure position of Fig. 2, up to 250 to 3000 pounds in the high pressure position of Fig. 3. To double the pressure in this type of operation, the air pressures in chambers 32 and 40 may be about equal at the initiation of the operation as in Fig. 1.

The shaft 52 may be driven at a speed of from 10 to 120 R. P. M. so that an entire cycle may be completed in from 6 seconds to ½ a second depending upon the type of operation. A usual positive multiple tooth clutch may be interposed between the drive and shaft 52 and may be connected with operating instrumentalities such that the operation may be either a one-cycle operation with the clutch tripped after each cycle or it may be a continuous operation in the hands of a skilled operator.

It often happens that between welding operations it is necessary for the insertion of the work to raise the upper electrode 4 and the cylinder 6 to the fully retracted position shown in Fig. 5. To accomplish this the valves 63, 67 and 69 are turned to admit air under pressure to the chamber 42 and to permit the escape of air from the chambers 32 and 40. To restore the parts to the position of Fig. 1, the valves are operated to exhaust chamber 42 and to replenish chambers 32 and 40.

My apparatus enables me to obtain a crack-free spot weld, even in thin sheets of aluminum alloys, in which the change through a plastic condition to a molten condition of the metal and vice versa takes place in a comparatively small temperature range, of the order of 30° F., and in which the dissipation of heat from the heated metal is very rapid due to the high thermal conductivity of such metals.

The preferred method which I carry out with the aid of my apparatus in spot welding aluminum alloy sheets is as follows. The high pressure may be first applied to the work as shown in Fig. 4, but this is not necessary. The work is pressed with the yielding low pressure as shown in Fig. 2, the welding current is passed through the work and the low pressure is maintained until the maximum welding temperature is reached. Because of the narrow temperature range in which the metal is plastic before it becomes molten, I do not attempt to prevent the metal from becoming molten at least in part, but I continue the current until some at least of the heated metal becomes molten. I then stop the application of further heat by cutting off the current or causing it to fall below the value sufficient to maintain the welding heat. I prefer to employ a welding current obtained by a condenser discharge, that is a single impulse current which reaches its maximum value practically instantaneously and then decreases. Preferably I stop the application of heat before the metal near and in contact with the electrodes has become so softened as to be indented by the final high pressure.

The instant that the metal ceases to be heated by the current it begins to cool with great rapidity because of its high thermal conductivity. But before the metal has time to cool and shrink sufficiently to form cracks or fissures, I apply abruptly and suddenly the high yielding pressure, Fig 3, which may be of the order of twice the low pressure. In the case of a current consisting of a condenser discharge the high pressure may be effective before the current has entirely ceased. The metal of the weld is maintained under this high pressure while it cools and shrinks thereby preventing cracks and forging the weld. The abruptness with which I change from low pressure to high pressure is of the greatest importance, for thereby I avoid the loss in time involved in the application of a high pressure by hand or by a valve controlled means for increasing the air pressure in a pressure applying cylinder, during which time the metal may cool, shrink and form cracks.

Whether the current flow be of the condenser discharge or A. C. type, the application of effective high pressure is precisely controlled with relation to the initiation of current flow, because both the high pressure lobe 57 and the switch operating arm 70 are mounted on the same shaft. Since the duration of the proper current, the intensity of the low pressure and the consequent temperature and condition of the metal may be predetermined, the abrupt application of high pressure may be precisely timed with relation to the state of the metal by choosing the proper relation of the lobe 57 and the arm 70. Thus the application of high pressure at exactly the same instant with relation to the instant of initiation of current flow in each cycle insures uniform welds in successive cycles. This precise and identical timing in each cycle is attained largely because I do not operate valves in applying the high pressure and because during my welding cycle there is no change of the air in the main and auxiliary chambers.

I claim:

1. An apparatus for applying yielding pressure to an electrode of a spot welding machine comprising an outer cylinder adapted to carry an electrode, an inner cylinder operating as a hollow piston in said outer cylinder and forming therewith a main air chamber, an inner piston in said inner cylinder forming therewith an auxiliary air chamber, means for moving said inner cylinder to apply pressure to said electrode by compressing the air in said main chamber and also for moving the inner cylinder relative to said inner piston to compress the air in the auxiliary chamber and means operated by said inner piston to apply the pressure of the air compressed in said auxiliary chamber to the electrode.

2. An apparatus for applying a yielding pressure to an electrode of a spot welding machine comprising an outer cylinder adapted to carry an electrode, an inner cylinder operating as a hollow piston in said outer cylinder and forming therewith a main chamber, an inner piston in said inner cylinder forming therewith an auxiliary air chamber, a cam lobe to move said inner cylinder to apply pressure to said electrode by compressing the air in said main chamber and a second cam lobe to move the inner cylinder relative to said inner piston to compress the air in the auxiliary chamber and means operated by said inner piston to apply the pressure of the air compressed in said auxiliary chamber to the electrode.

3. An apparatus for applying yielding pressure to an electrode of a spot welding machine comprising an outer cylinder adapted to carry an electrode, an inner cylinder operating as a piston within said outer cylinder and forming therewith a main air chamber, an inner piston movable within said inner cylinder and forming therewith an auxiliary air chamber, two cam lobes for moving said inner cylinder, one of said lobes moving said inner cylinder to apply pressure to said electrode through the air compressed in said main chamber, and a rod carried by said inner piston and adapted to engage said outer cylinder to apply pressure to said electrode through air compressed in said auxiliary chamber during movement of said inner cylinder caused by the second of said lobes.

4. An apparatus for applying yielding pressure to an electrode of a spot welding machine, comprising a cylinder adapted to carry an electrode, a hollow piston contained within said cylinder and forming therewith a main chamber, a piston contained and movable within said hollow piston and forming therewith two auxiliary chambers, a source of compressed air, air lines connecting said source to each of said three chambers, and three-way valves, one in each of said air lines, for selectively maintaining air under compression in one or more of said chambers whereby air may be periodically exhausted and restored to said chambers independently, to move said inner piston relative to said hollow piston.

5. A spot welding machine having in combination a chamber formed by side and end walls, one end wall being adapted to carry an electrode, said chamber being adapted to contain air under pressure to constitute a compressed air cushion, a second chamber formed by side and end walls and adapted to contain air under pressure to constitute a second compressed air cushion, means to apply first a relatively low pressure and then a relatively high pressure to said electrode, said means comprising devices to impart to said electrode first the pressure exerted against said electrode carrying end wall by air in the first named air cushion and then abruptly to impart to said electrode the combined pressures exerted against end walls of both of said chambers by air in both of said air cushions.

6. A spot welding machine having in combination relatively slidable walls forming a closed chamber, one of said walls being adapted to carry an electrode, said chamber being adapted to contain air under pressure to constitute a compressed air cushion, relatively slidable walls forming a second closed chamber adapted to contain air under pressure and constituting a second compressed air cushion, means to apply first a relatively low pressure and then a relatively high pressure to said electrode, said means comprising devices to impart to said electrode first the pressure of air exerted against said electrode carrying wall by air in the first-named air cushion and then abruptly to impart to said electrode the pressure exerted against walls of both of said chambers by air in both of said air cushions.

7. A spot welding machine having in combination relatively slidable walls forming a closed chamber, one of said walls being adapted to carry an electrode, said chamber being adapted to contain air under pressure to constitute a compressed air cushion, relatively slidable walls forming a second closed chamber adapted to contain air under pressure and constituting a second compressed air cushion, a cam lobe for moving the walls of said first chamber to apply a relatively low pressure of air contained in said first air cushion to said electrode, a second cam lobe for periodically moving the walls of said second chamber to apply the additional pressure of air contained in said second air cushion to said electrode and thereby impart periodically to said electrode the combined pressures of both of said air cushions, and rotatable means for operating said cam lobes.

8. A spot welding machine having in combination relatively slidable walls forming a closed main air chamber adapted to contain air under pressure to constitute a compressed air cushion, relatively slidable walls forming a closed auxiliary air chamber adapted to contain air under pressure to constitute an auxiliary compressed air cushion, one of the walls of said main air chamber carrying an electrode holder, one of the walls of said auxiliary air chamber being adapted for periodic connection with said electrode holder, and means to apply first a relatively low pressure and then a relatively high pressure to said electrode, said means comprising a cam lobe for moving the walls of said first chamber to apply the pressure of air contained in said main air cushion to an electrode carried by said electrode holder, and a second cam lobe for periodically moving the walls of the auxiliary chamber to connect said wall of said auxiliary chamber with said electrode holder and apply the pressure of air contained in said auxiliary air cushion to said electrode.

9. A spot welding machine having in combination rotatable means having two cam lobes, means operated by one of said lobes and including a closed pneumatic cushion to apply pressure of relatively low intensity to an electrode and means operated by the other of said lobes and including another closed pneumatic cushion to apply additional pressure to said electrode.

10. A spot welding machine having in combination rotatable means having three cam lobes, means operated by one of said lobes and including a closed pneumatic cushion to apply pressure of relatively low intensity to an electrode, and means operated by the other two of said lobes and including another closed pneumatic cushion to apply additional pressure to said electrode, whereby pressure of high, low and high intensity may be successively applied to said electrode in each revolution of said rotatable means.

11. An apparatus for applying yielding pressure to an electrode of a spot welding machine comprising a cylinder adapted to carry an electrode, an inner cylinder operating as a piston in said outer cylinder and forming therewith a main closed air chamber, an inner piston in said inner cylinder and forming therewith another closed air chamber, and means for moving said inner cylinder towards said electrode to an intermediate position to apply a low pressure to said electrode through air confined in said main chamber only and to an advanced position to apply a high pressure to said electrode through air confined in both of said chambers.

12. An apparatus for applying yielding pressure of different intensities to an electrode of a spot welding machine comprising cylinder and piston members forming a main closed air chamber, one of said members being adapted to carry an electrode, means for moving the other of said members towards said electrode into intermediate and advanced positions to apply pressure to said electrode through air confined in said main chamber, auxiliary cylinder and piston members forming an auxiliary air chamber, one of said auxiliary members being connected and movable towards said electrode with said main member, and an element interposed between said electrode and the other of said auxiliary members for transmitting the additional pressure of air compressed in said auxiliary chamber to said electrode upon advance of said connected members to advanced position.

13. An apparatus for applying yielding pressure to an electrode of a spot welding machine comprising an outer cylinder adapted to carry an electrode, an inner cylinder operating as a piston in said outer cylinder and forming therewith a main air chamber, an inner piston in said inner cylinder forming another auxiliary air chamber, and means for moving said inner cylinder to apply pressure to said electrode by compressing air contained in said main chamber and also by compressing air contained in both of said chambers.

14. A spot welding machine having in combination rotatable means carrying two cam lobes, a relatively low lobe and a relatively high lobe, a vertically slidable inner cylinder having end walls and side walls, said cylinder being spring pressed into the paths of said cam lobes, an inner piston in said cylinder, said piston and said upper end wall and side walls of said cylinder forming a chamber adapted to contain a cushion of air under pressure, a vertically slidable outer cylinder, within which the inner cylinder slides, having end and side walls forming with the lower end wall of the inner cylinder a chamber adapted to contain a cushion of air under pressure, the lower end wall of the outer cylinder being adapted to carry an electrode, whereby when said low lobe moves the inner cylinder down it acts through the air cushion in the outer cylinder to move the outer cylinder down to apply the pressure of said air cushion to said electrode, a vertical rod interposed between the piston in the inner cylinder and the lower wall of the outer cylinder and adapted to connect said inner piston and the outer cylinder when said high lobe contacts said inner cylinder, whereby when said high lobe contacts said inner cylinder it moves said inner cylinder further down thereby further compressing the air of said first-named air cushion and connecting said vertical rod with the lower wall of said outer cylinder to apply the pressure of the air cushion in said inner cylinder to said lower wall of said outer cylinder and to the electrode.

15. A spot welding machine having in combination a rotatable shaft having a cam with two lobes, a relatively low lobe and a relatively high lobe, a crosshead having a part spring pressed against said cam, a vertically slidable inner cylinder having end walls and side walls the upper end wall being connected to said crosshead, a piston in said cylinder, said piston and said upper end walls and side walls of said cylinder forming a chamber adapted to contain a cushion of air under pressure, a vertically slidable outer cylinder, within which the inner cylinder slides, having end and side walls forming with the lower end wall of the inner cylinder a chamber adapted to contain a cushion of air under pressure, the lower end wall of the outer cylinder being adapted to carry an electrode, whereby when said low lobe operates said crosshead it moves the inner cylinder down which, acting through the air cushion in the outer cylinder, moves the outer cylinder down to apply the pressure of said air cushion to said electrode, a vertical rod having its upper end secured to the piston in the inner cylinder and having its lower end adjacent to but spaced from the lower end wall of the outer cylinder when the crosshead contacts with said cam except at said high lobe, whereby when said high lobe operates said crosshead it moves said inner cylinder further down thereby further compressing the air of said first-named air cushion and bringing the lower end of said vertical rod against the lower wall of said outer cylinder to apply the pressure of the air cushion in said inner cylinder to said lower wall of said outer cylinder and to the electrode.

16. In a welding machine, motive means having two cylinder members, an outside one and an inside one movable in the outside one, and a piston member movable in said inside cylinder member, a work engaging part, means connecting said part to one of said members, means for movably supporting said inside cylinder member, means for moving said inside cylinder member to thereby advance said piston member and to cause said part to move to a work engaging position, and means for introducing an elastic fluid at controllable pressure into a space between the head of the inside cylinder member and the piston member so as to urge said piston member to move said part as the inside cylinder member is moved, said elastic fluid enabling said inside cylinder member to continue to advance after said part has reached work engaging position.

HERMANN W. STIEGLITZ.